United States Patent [19]
Vitel et al.

[11] Patent Number: 6,145,896
[45] Date of Patent: Nov. 14, 2000

[54] PIPE COUPLER

[75] Inventors: Jean Pierre Vitel, Thiaucourt-Regnieville; Pierre Louis Barbe, Bicqueley; Jean-Paul Gaillot, Nancy; Bernard Coche, Montauville, all of France

[73] Assignee: Pont-A-Mousson, Nancy, France

[21] Appl. No.: 09/179,841

[22] Filed: Oct. 28, 1998

[30] Foreign Application Priority Data

Oct. 30, 1997 [FR] France ................................. 97 13655

[51] Int. Cl.$^7$ .................................................. F16L 23/00
[52] U.S. Cl. .......................... 285/414; 24/279; 285/419
[58] Field of Search .................................. 285/419, 420, 285/112, 320, 39, 414, 286, 119, 373; 24/279, 284

[56] References Cited

U.S. PATENT DOCUMENTS

| | | |
|---|---|---|
| 2,227,551 | 1/1941 | Morris . |
| 2,739,018 | 3/1956 | Collett ..................................... 285/419 |
| 3,479,066 | 11/1969 | Gittleman ............................... 285/236 |
| 3,944,265 | 3/1976 | Hiemstra et al. ....................... 285/419 |
| 4,155,574 | 5/1979 | Husley .................................... 285/419 |
| 4,790,574 | 12/1988 | Wagner et al. ......................... 285/419 |
| 5,362,107 | 11/1994 | Bridges .................................. 285/419 |
| 5,383,496 | 1/1995 | Bridges et al. ......................... 285/419 |

FOREIGN PATENT DOCUMENTS

| | | |
|---|---|---|
| 2 237 111 | 2/1975 | France . |
| 1 475 874 | 7/1969 | Germany . |

*Primary Examiner*—Lynne H. Browne
*Assistant Examiner*—Tomlyne A Malcolm
*Attorney, Agent, or Firm*—Sughrue, Mion, Zinn, Macpeak & Seas, PLLC

[57] ABSTRACT

A coupler (10) for pipes is designed for end-to-end assembly of pipe elements (2,4). It contains a waterproof tubular elastomer gasket (14), an exterior collar (12) which contains a collar that is cut longitudinally and at least partially covers the gasket, and means (16) for tightening the collar to bring together its extremities and to compress the waterproofing gasket. The means for tightening contains two matched flanges (18, 20) attached to each extremity of the collar, and means (22) for fastening the two flanges one to the other.

14 Claims, 5 Drawing Sheets

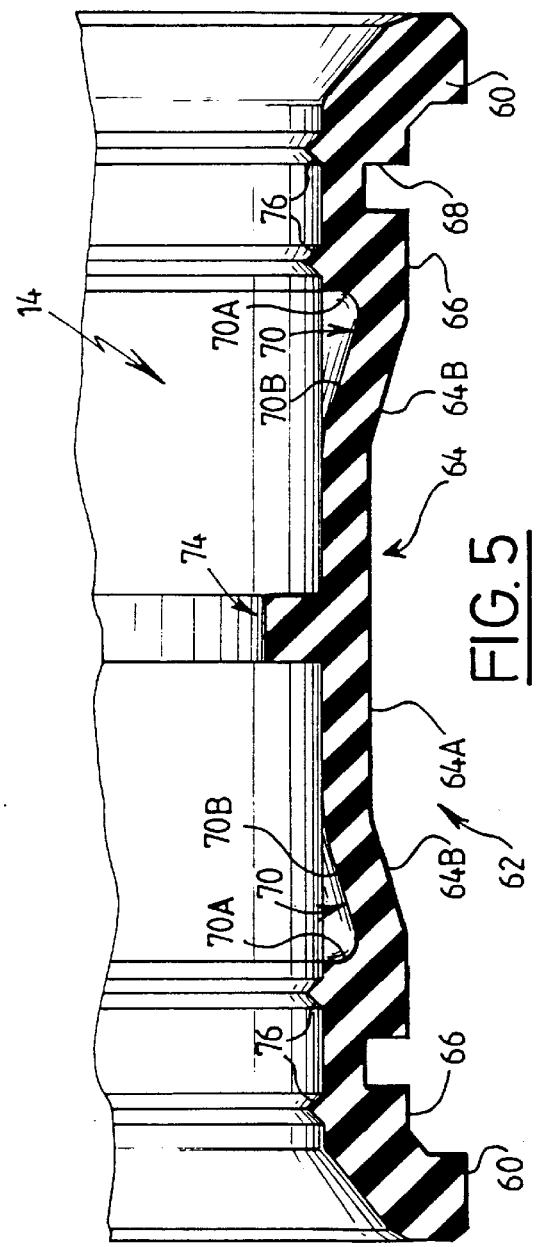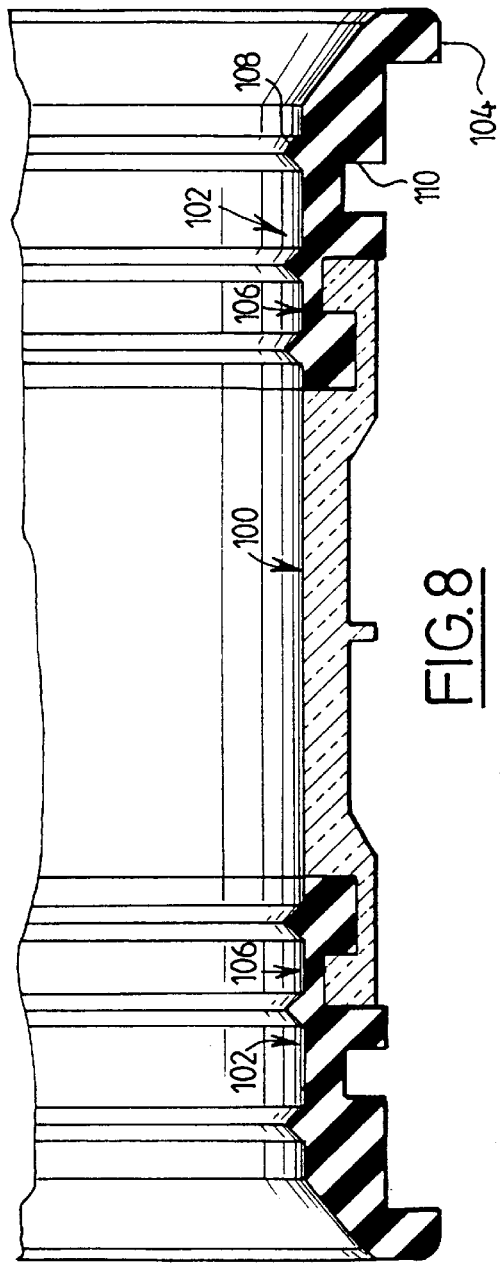

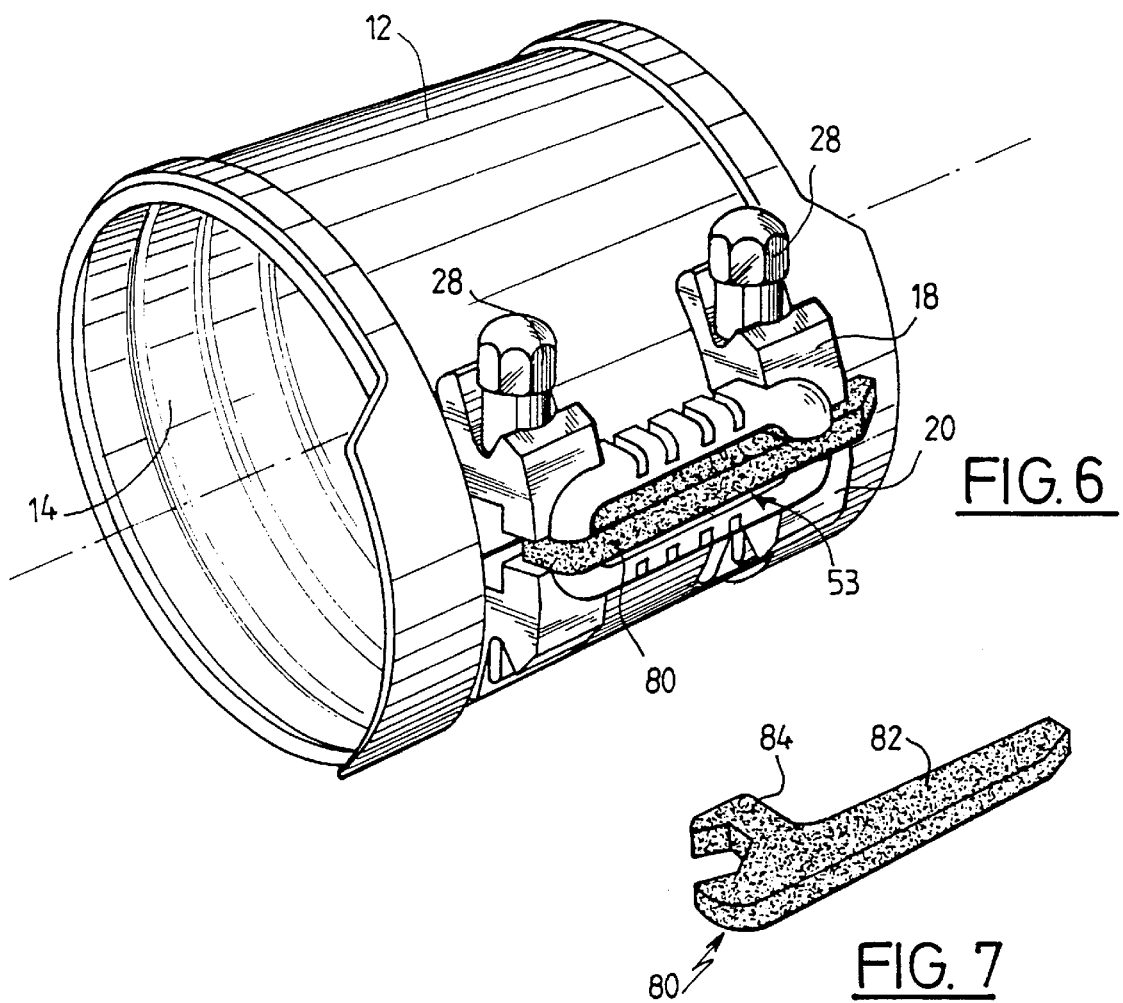

6,145,896

PIPE COUPLER

BACKGROUND OF THE INVENTION

This invention relates to a coupler for pipe elements designed for the end-to-end assembly of pipes, of the type consisting of a waterproof tubular elastomer gasket, an external sleeve that contains a collar that is split longitudinally and that covers at least partially the gasket, and means to tighten the collar to bring together the lateral extremities of the collar and thus compress the waterproofing gasket.

Such a coupler is for example described in the French patent application filed under Number 96-01232 on Feb. 1, 1996 in the name of the Applicant. This application describes a device for the end-to-end assembly of pipe elements formed by such a coupler. Even though the coupler described in that application functions in a satisfactory manner, its installation is sometimes delicate since it requires the use of a strap to surround the whole coupler.

SUMMARY OF THE INVENTION

It is this invention's goal to provide an alternative to the coupler described in that document, that does not require a strap to tighten the external sleeve and that may be used on pipe elements that do not possess beveled extremities.

Therefore, the invention concerns a coupler for pipe elements designed for the end-to-end assembly of pipe elements, of the aforementioned type, characterized in that the means to tighten consist of two matched flanges, attached to each lateral extremity of the collar, and of means of fastening the two flanges one to the other.

According to the particular implementation methods, the coupler has one or more of the following characteristics:

- the two flanges contain at least one pair of coaxial shafts and the means of fastening consisting of at least one bolt driven in the pair (or in each pair) of shafts;
- the two flanges contain supplementary support surfaces adapted to cooperate and to control the proximity of the extremities of the collar;
- it contains a removable wedge that is placed between the two flanges. This wedge defines a predetermined interval between the extremities of the collar that is adapted to the installation of the coupler on the (or on each) pipe element;
- the wedge contains a guiding profile adapted to match the profile set on the (or on each) bolt and thus constitutes a tightening tool of the (or of each) bolt;
- the two flanges contain, according to their thickness, facing indentations that delimit an access window to the gasket;
- the collar contains a tubular metallic band, opened following a guide, said band containing openings in its facing extremities in order to set the flanges and the flanges contain legs that fit in said openings, said legs insure the attachment of the flanges to the extremities of the collar;
- the tubular gasket contains, set in its outside surface upon which the collar rests, hollows to receive the legs that attach the flanges to the collar's extremities;
- the open collar contains, at its extremities, facing indentations that delimit a window through which the gasket can be seen;
- each flange contains, laterally, two pillars attached to the collar and a bridge set apart from the collar that links these two pillars, each flange defining a pressure ring on the coupler;
- the two flanges have complementary profiles on their facing edges that overlap the extremities of the collar and facilitate the matching of the two flanges;
- the tubular gasket contains, externally and on each side, ring grooves that delimit the circular seat of insertion of the collar;
- the gasket contains on its interior surface a set of waterproofing circular ridges designed to be pressed according to their crest line on the (or each) pipe element;
- the tubular gasket contains on its interior surface a positioning ridge that acts as a stopper for the (or each) pipe element;
- the gasket is generally made of an opaque material and contains, in its median area, at least one window made of transparent material in order to insure visual access to the (or each) pipe element.

BRIEF DESCRIPTION OF THE DRAWINGS

The invention will be better understood in the reading of the following description, shown strictly as an example, which makes reference to the drawings, on which:

FIG. 5 is a partial view of a longitudinal cut of a first implementation method of the waterproofing gasket of the coupler according to the invention;

FIG. 6 is a perspective view of the coupler from FIG. 1, represented before assembly and tightening of the sleeve and containing a flange-spreading wedge;

FIG. 7 is a perspective view of the wedge of FIG. 6;

FIG. 8 is a partial view in a longitudinal cut of a second implementation of the waterproof coupler.

DETAILED DESCRIPTION OF THE PREFERRED EMBODIMENTS

Figure 1:
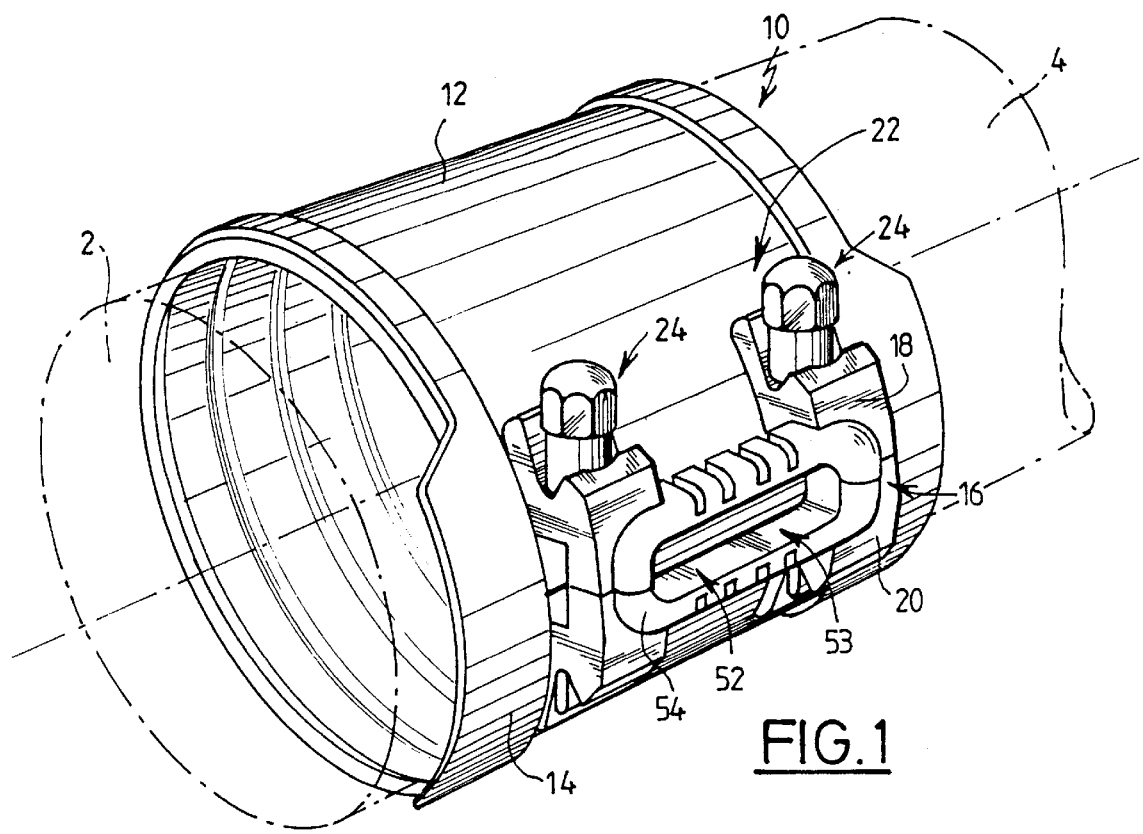
FIG. 1 is a perspective view of a piping segment in which two successive pipes are assembled using a first implementation of the coupler according to the invention.
Figure 2:
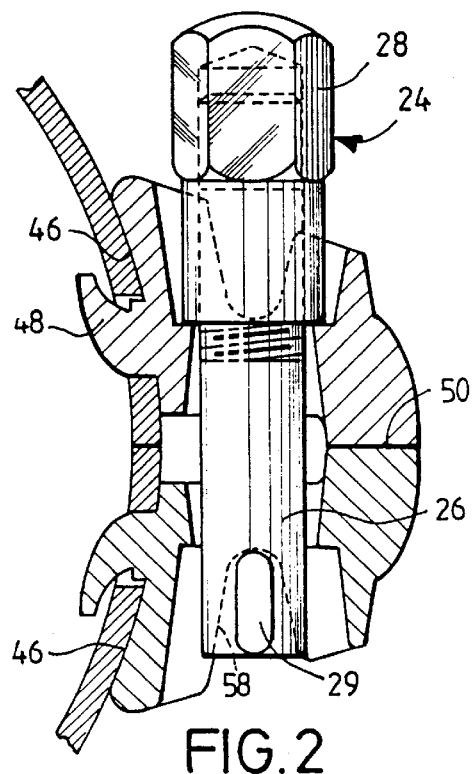
FIG. 2 is a partial view in a transversal cut of the coupler, in the zone that contains the means of tightening the sleeve (the waterproofing gasket is not shown)

The coupler for pipe elements shown on FIGS. 1 and 2 is designed either for the end-to-end assembly of pipe elements or for the repair of a defective piece of pipe.

The coupler is designed to be used in water purification installations. Its interior diameter may be 171.5 mm and its length may be 175 mm.

FIG. 1 shows a segment of piping formed of two pipe elements 2, 4, linked together end-to-end by a coupler 10 according to the invention. This coupler contains an exterior sleeve formed by a tubular collar 12 that is cut longitudinally and set on the juxtaposed extremities of pipes 2, 4 with interposition of a closed rim tubular waterproofing gasket or sleeve 14 made of elastomer.

The sleeve furthermore contains the means 16 to tighten the sleeve to bring together the two extremities of the collar and to compress the waterproofing gasket. These tightening means 16 consist of two identical matched flanges 18, 20, each attached to one extremity of the collar. The means of tightening 16, further contain the means 22 to bring the two flanges together. These movement means 22 contain, in the implementation shown, two bolts 24 each formed of a screw 26 and of a six-sided nut 28. There bolts are inserted into the two coaxial openings set in flanges 18, 20.

The screw 26 of the movement means has a flat head 29 that extends perpendicularly to the shaft of the screw. Thus, the shaft of the screw extended by the head 29 generally resembles a T. The screw shaft consists of a first smooth segment prolonged at the extremity opposite head 29 by a threaded section that is designed to received the nut 28. This nut is, for example, a blind nut.

Figure 3:
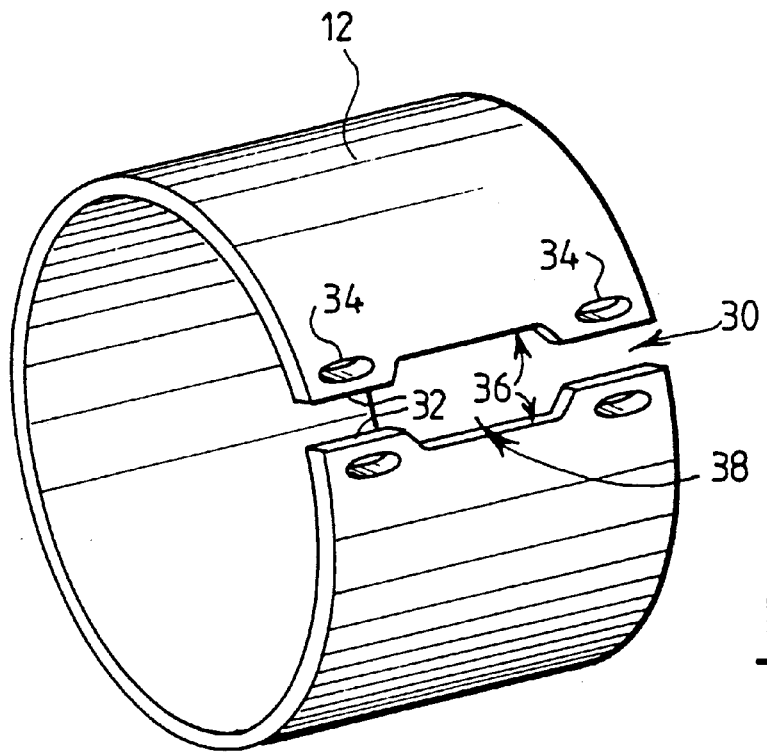
FIG. 3 is a perspective view of the collar implemented in the coupler according to the invention.

As shown in FIG. 3, the collar 12 that forms the sleeve is formed of a coupler tube, of circular section in this example. The collar is opened along a guide that spans the whole length. Thus, on each side of the split 30 thus created, the collar has two facing extremity edges 32. The collar is made of metal, notably of cast-iron.

The collar contains, near each edge 32, two oblong openings 34 to anchor the flanges, whose axes follow a guide in the collar. Furthermore, each edge 32 contains an indentation 36 along its median section that stretches between the two oblong openings 34. The two indentations 36 face each other and delimit a relatively rectangular window 38.

Figure 4:
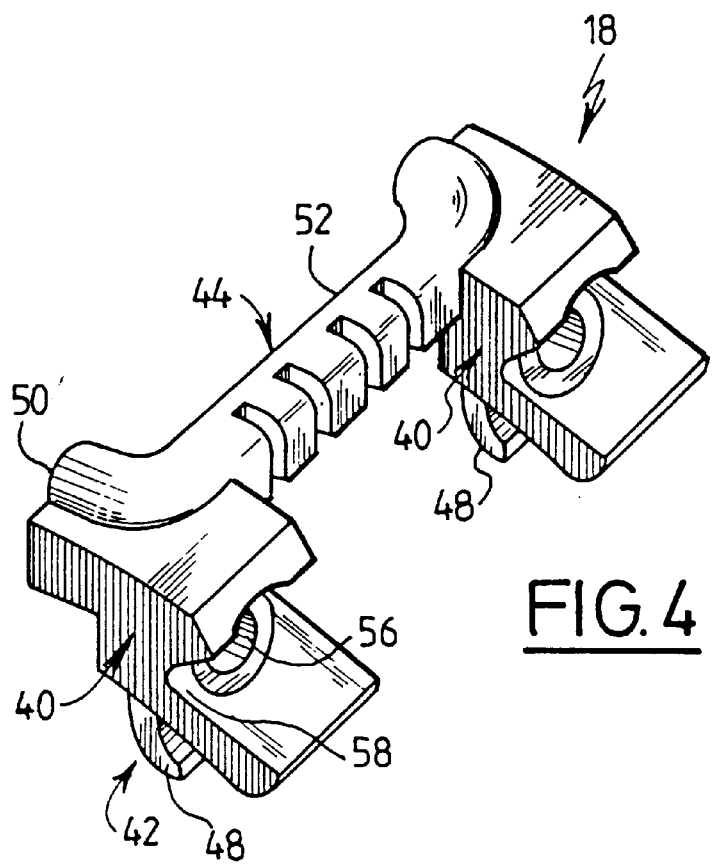
FIG. 4 is a perspective view of a flange of the coupler according to the invention.

FIG. 4 shows a perspective view of one of the flanges 18 that are attached to the extremities of the sleeve, in order to insure its tightening.

This flange is made of a single metal piece, notably of cast-iron. It contains, laterally on both sides two pillars 40 that contain, on their interior surface, means 42 to attach to the extremities of the sleeve. The pillars 40 are linked together in their superior section by a bridge 44.

As shown in FIG. 2, the interior surface 46 of the pillars 40 is a cylindrical surface complementary to the cylindrical external surface of the collar 12.

The attachment means 42 contain curved legs 48 that are in relation to the pillars nearly at the center of the interior surface 46. These legs 48 are designed to be inserted in the oblong openings 34 of the collar 12. They are curved towards the rear, in such a manner that after assembly, the free extremities of the legs of the two flanges face away from each other. The legs 48 are, at least at the roots, of an oblong shape that matches that of the shape of the openings 34, in order to avoid any possibility of vibrations.

The bridge 44 is offset from the axis of the pillars 40 and reaches partially in an overhang in relation to the pillars 40. The forwards section, in overhand, presents a flat support surface 50 designed to allow the two facing flanges to come into contact with one another.

The facing surfaces 50 each contain in the median section an indentation 52. These facing indentations delimit an window 53 to visually access the interior of the coupler. The indentation 52 is bordered, on the external surface of each flange, by a peripheral ridge 54.

The pillars 40 have transverse shaft openings 56, to the front, below the support surface 50, and, to the rear, nearly at the center of the rear surface of the pillar. The rear surface of each pillar is hollowed by a groove 58 whose axis is parallel to the bridge 44 and perpendicular to the direction of the curved legs 48. These grooves are designed to receive the heads 29 of the tightening screws.

FIG. 5 shows the cut of the gasket 14 placed between the collar 12 and the pipe elements to be assembled. This gasket resembles a symmetrical coupler and is made of elastomer.

This coupler is bordered, on the outside at both extremities, by external ridges 60 that delimit between themselves a hollow ringed seat to receive the collar 12. The cylindrical surface in which the collar rests is hollowed, in its median section, by a periphery hollow 64 which has a flat bottom 64A and beveled edges 64B. This hollow 64 is bordered on each side by flat sections 66 that are next to the ridges 60. These flat sections 60 have ring grooves 68 designed to receive the attaching legs 48 of the flanges.

On its interior surface, the gasket 14 has, matching the beveled edges 64B of the hollow, peripheral hollows 70 delimited by an angled section 70B that nearly parallels the beveled edges 64 and ends in a section in the shape of an arc 70A.

Thus, in its median section, the gasket 14 contains a ring wall of nearly constant thickness whose central section is in the same axis as that of the gasket.

Following its axis of symmetry, the gasket 14 contains an internal peripheral ridge 74 that forms a stopper designed to insure the proper positioning to the coupler between the pipe elements to be assembled. The ridge 74 is preferably of square cross-section.

Besides, on the outside of the grooves 70, the cylindrical interior lateral surface of the gasket 14 contains some peripheral waterproofing ridges 76. These are formed, for example, as triangular sections whose crest line is designed to be applied to the external surface of pipe elements.

FIG. 6 shows the coupler according to the invention in the way it is delivered, before it is installed on pipe elements. In this configuration, we note a wedged tool 80 inserted between the two flanges 18, 20 and more particularly between their facing surfaces 50.

The wedge tool 80, shown by itself in FIG. 7, is of an elongated shape and has a constant thickness. It defines a predetermined spreading of the flanges corresponding to a tightening of the gasket adapted to allow its installation on pipe elements, even if these do not possess beveled edges.

In the described implementation, the wedge tool 80 consists of a handle or bar 82 extended on one end by a jaw 84 that is designed with a guiding profile to fit the exterior profile of the nuts 28. This, the wedge tool 80, consisting of an elongated element with such a guiding profile, constitutes an adapted wrench, to insure the tightening of the nuts 28. It is for example made of 10 mm thick sheet metal. It may also be made of cast iron. Advantageously, on the greatest part of its surface, the wedge tool 80 that makes a wrench has two plastic plates (not shown) that when attached, form a handle for the wrench.

The assembly of the coupler is performed in the following manner. The gasket 14, made of elastomer, is inserted by elastic deformation inside the coupler 10 coupler 12. The two flanges 18, 20 are then set face to face on the extremities of the coupler 10. To this effect, the curved legs 48 are inserted into the oblong openings 34, as represented in FIG. 2. The screws 26 are then inserted, in the same direction, in the pair of aligned shafts 56 set in the flanges. The screw heads 29 being received in the groove 58, the nuts 28 are then screwed to the threaded extremities of the screws. The wrench wedge tool 80 is then inserted between the two teeth, the jaw 84 of the wrench being set over one of the screw shafts, the bar forming the body of the wrench resting parallel to the length of the flanges.

The nuts 28 are then tightened by hand so that wedge tool 80 will remain between the flanges.

Thus maintained between the two flanges, the wedge tool defines an optimal tightening of the collar, corresponding to a compression of the gasket permitting the insertion of one or two pipe elements inside of the coupler without any insertion effort.

In order to insure the marriage of two pipe elements, their two extremities are inserted on either side of the coupler, until they butt against the peripheral stopper ridge 74. The nuts 28 are then untightened slightly in order to extract the wrench wedge tool 80, the screws 28 being maintained rotationally fixed in relation to the flange by the insertion of the heads 29 in the grooves 58. The tightening of the nuts is performed with the aid of the wrench 80 until the surfaces 50 come into contact with one another, limiting therefore the coming together of the collar's extremities.

The thickness of the wedge tool 80 is determined to be such as, when the surfaces 50 come into contact with one another, the compression of the waterproofing gasket is optimal in order to insure a reliable linkage of the pipe elements.

FIG. 8 represents a variation of the implementation of a gasket to be used in a coupler according to the invention.

This gasket differs in that it contains an intermediary section 100 made of transparent plastic. This intermediary section 100 is linked on each side to two symmetrical extremity sections 102 made of elastomer. These have, on the exterior, ridges 104 similar to the ridges 60 that define the seat of the collar 12. The extremity sections 102 and the intermediary section 100 are over-molded and are linked by complementary hollow and extruding profiles referred to generally as 106. As before, the extremity sections 102 contain on their interior surface waterproofing periphery ridges 108. They furthermore contain on their external surface, grooves 110 to receive the attachment legs 48.

The coupler equipped of such a gasket, whose central section is transparent, allows a correct visual positioning of the coupler in the end-to-end marriage zone of the two pipe elements. Actually, the windows 38, 53 defined by the superposed indentations 36 and 52 that are set respectively in the collar and in the flanges allow visual access to the extremities of the pipes inserted in the coupler.

In this case, the stopper 74, set on the interior surface of the gasket is optional, since the positioning may be performed under the operator's visual control.

Besides, in a variation not shown, the collar 12 has a row of openings in its middle section that allow visual access of the extremities of the pipe elements through the gasket's transparent section.

Figure 9:
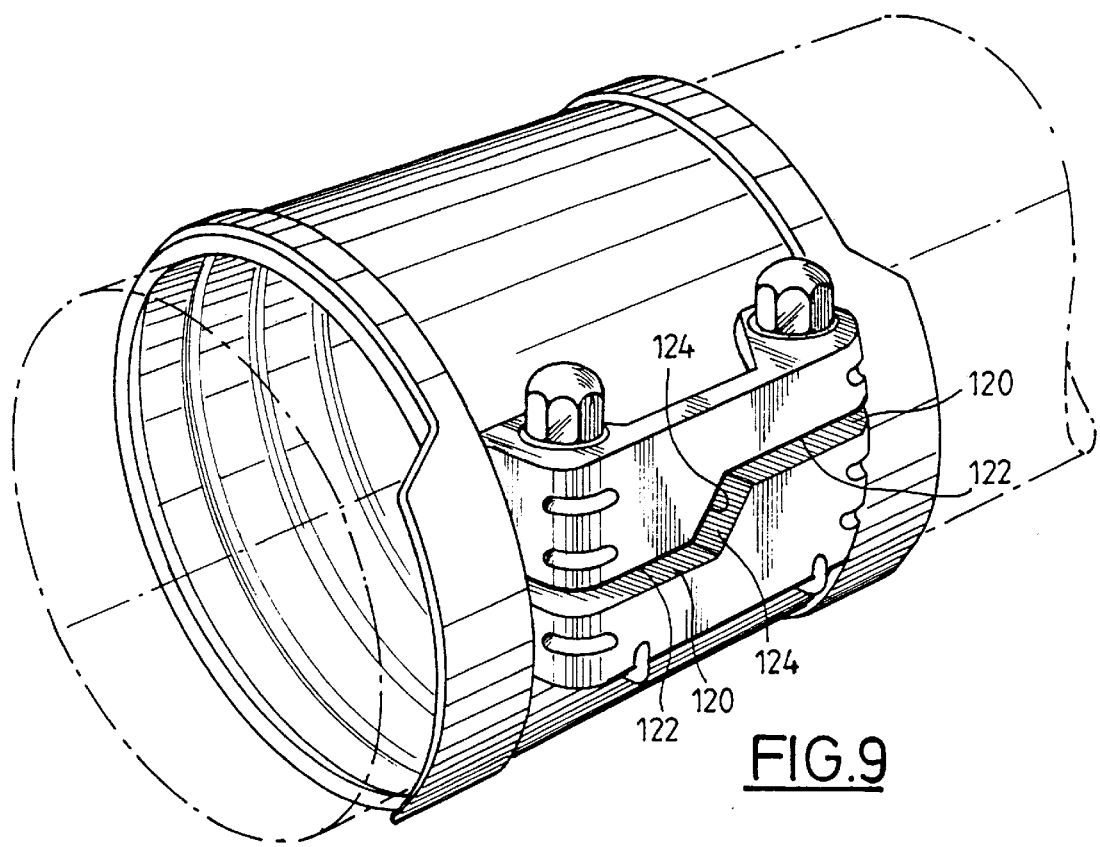
FIGS. 9 and 10 are perspective views of two pipes coupled by means of two other implementations of the coupler according to the invention.
Figure 10:
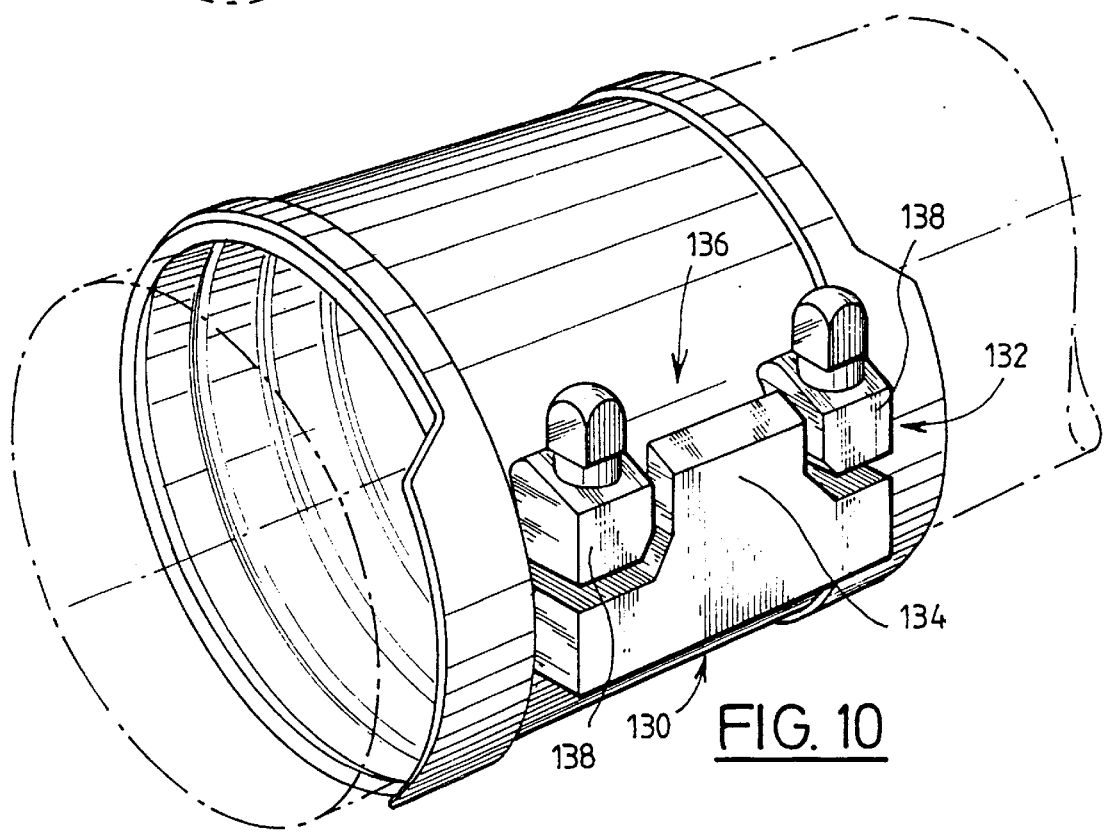

FIGS. 9 and 10 show two implementations variations of flanges that may be used for the coupler according to the invention.

In these Figures, at least one of the flanges contains a section which extends beyond the edges 32 in respect to the collar, thus insuring a guiding during the positioning of the two extremities of the collar.

In the implementation of FIG. 9, the two flanges are identical and present complimentary shapes. Thus, the facing surfaces of the flanges have an "S" shape. They each have two parallel surfaces 120, 122 that extend parallel to the longitudinal cut 30 done in collar 12. The two parallel faces 120, 122 of a same flange are linked by an inclined surface 124.

In the implementation of FIG. 10, the two flanges 130, 132 are different. Flange 130 has a tongue 134 which is designed to be inserted in a passage 136 set between the two pillars 138 of flange 132 borne by the other extremity of the collar 12.

In the implementation of FIGS. 1 and 9, it is understood that the bridges 44 forming the linking part of the flanges are offset from the collar 12. An opening is thus formed between the bridges and the collar for the passage of the fingers of a hand so that the bridges can also serve as a handle for the coupler.

As a variation (not shown) the wedge tool 80 may contain a handle to carry the coupler.

In another variation, the transparent area set in the gasket can be limited to a window stretching only over a short section of the periphery of the gasket.

We note that such a coupler, when is does not have the interior surface pipe elements positioning stopper ridge, can be slid completely over one pipe element with a smooth exterior surface. In particular, two couplers of this type can be used to proceed with the repair of a pipe that has a leak in its body. To do this, the pipe is cut on each side of the leak in order to extract the defective section. The defective section is replaced by a new pipe element of the same length.

In order to insure the link between the new pipe element and the two other pipe elements, slide a coupler according to the invention without the stopper ridge over each end of the pipes near the location where the defective pipe was removed. In the absence of such a stopper ridge, the two couplers can be fully slid over the two remaining pipe elements.

Then the new pipe segment is placed between the two initial pipe elements.

In order to insure the link and the waterproofness of the new section with the two initial pipe elements, the couplers are moved so they overlap the new section at each of its extremities. When the two couplers are each overlapping both an extremity of the new pipe section and of the initial pipe section, they are tightened to insure a definite marriage.

Generally, such a coupler insures a linking of pipe elements while using almost no other tools.

Furthermore, its installation does not require specially trained installers.

What is claimed is:

1. A coupler (10) for the end-to-end assembly of two pipe elements (2, 4), the coupler comprising: a tubular elastomer waterproofing gasket (14), an exterior collar (12) having a longitudinal cut and at least partially covering the gasket, and means (16) for tightening the collar to bring facing lateral extremities thereof closer and compress the waterproofing gasket, wherein the tightening means comprises two matched flanges, each attached to a lateral extremity of the collar, and means (22) for bringing the two flanges together, and wherein the collar comprises a tubular metallic sleeve having, in said facing extremities, openings (34) for the attachment of the flanges, and the flanges have legs (48) inserted in said openings, said legs insuring the attachment of the flanges to the extremities of the collar.

2. Coupler according to claim 1, wherein the two flanges have at least one pair of coaxial shafts (56) and the means to bring the flanges together contain at least one bolt (24) inserted in the or each pair of shafts (56).

3. Coupler according to claim 1, wherein the two flanges contain complementary pressure surfaces (50) adapted to cooperate and limit the bringing together of the two extremities of the collar.

4. Coupler according to claim 2, further comprising a removable wedge (80) set between the two flanges, said wedge defining a predetermined interval between the extremities of the collar adapted for the installation of the coupler on the or each pipe element.

5. Coupler according to claim 4, wherein the wedge has a guiding profile (84) adapted to cooperate with the profile of the or each bolt (24) and thus constitutes a tightening tool.

6. Coupler according to claim 1, wherein the two flanges contain facing indentations (52) that delimit a gasket access window (53).

7. Coupler according to claim 1, wherein the tubular gasket has, in an exterior surface thereof on which the collar rests, grooves (68, 110) designed to receive the legs that link the flanges to the extremities of the collar.

8. Coupler according to claim 1, wherein the collar contains, at its lateral extremities, facing indentations (36) that delimit a window (38) to view the gasket.

9. Coupler according to claim 1, wherein each flange contains, laterally, two pillars (40) attached to the collar and a bridge (44) offset from the collar (12) linking the two pillars, each flange defining a handle of the coupler.

10. Coupler according to claim 1, wherein the two flanges contain on their facing surfaces complementary profiles that overlap the extremities of the collar and facilitate the matching of the two flanges.

11. Coupler according to claim 1, wherein the tubular gasket contains, on its outside surface and on either side, ring ridges (60) that delimit between themselves a ring seat (62) to receive the collar.

12. Coupler according to claim 1, wherein the gasket has on its interior surface a set of waterproofing ridges (76, 108) adapted to align themselves according to crest lines upon the or each pipe element.

13. Coupler according to claim 1, wherein the tubular gasket has on its interior surface a positioning stopper ridge (74) adapted to fit the or each pipe element.

14. Coupler according to claim 1, wherein the gasket is partially made of an opaque material and contains, in a median area, at least one window (100) made of a transparent material insuring visual access to the or each pipe element.

* * * * *